US011846091B2

(12) United States Patent
Vorobiev et al.

(10) Patent No.: US 11,846,091 B2
(45) Date of Patent: Dec. 19, 2023

(54) SYSTEM AND METHOD FOR CONTROLLING AN IMPLEMENT ON A WORK MACHINE USING MACHINE VISION

(71) Applicant: Topcon Positioning Systems, Inc., Livermore, CA (US)

(72) Inventors: Mikhail Yurievich Vorobiev, Moscow (RU); Alexey Vladislavovich Zhdanov, Moscow (RU); Ivan Alexandrovich Bogdanyuk, Primorsky Kraj (RU); Nikolay Nikolaevich Vasilyuk, Moscow (RU)

(73) Assignee: TOPCON POSITIONING SYSTEMS, INC., Livermore, CA (US)

( * ) Notice: Subject to any disclaimer, the term of this patent is extended or adjusted under 35 U.S.C. 154(b) by 731 days.

(21) Appl. No.: 16/976,480

(22) PCT Filed: Jan. 28, 2020

(86) PCT No.: PCT/RU2020/000039
§ 371 (c)(1),
(2) Date: Aug. 28, 2020

(87) PCT Pub. No.: WO2021/154111
PCT Pub. Date: Aug. 5, 2021

(65) Prior Publication Data
US 2021/0230842 A1 Jul. 29, 2021

(51) Int. Cl.
*E02F 9/26* (2006.01)
*E02F 3/76* (2006.01)
(Continued)

(52) U.S. Cl.
CPC ............ *E02F 9/264* (2013.01); *E02F 3/7609* (2013.01); *E02F 3/80* (2013.01); *E02F 9/02* (2013.01);
(Continued)

(58) Field of Classification Search
None
See application file for complete search history.

(56) References Cited

U.S. PATENT DOCUMENTS

| 6,317,676 B1 | 11/2001 | Gengler et al. |
| 7,845,560 B2 | 12/2010 | Emanuel et al. |

(Continued)

FOREIGN PATENT DOCUMENTS

| JP | 2005256232 A | 9/2005 |
| JP | 2010117230 A | 5/2010 |

(Continued)

OTHER PUBLICATIONS

International Search Report and Written Opinion dated Oct. 15, 2020, in connection with International Patent Application No. PCT/RU2020/000039, filed Jan. 28, 2020, 9 pgs.

(Continued)

*Primary Examiner* — Jonathan M Dager
(74) *Attorney, Agent, or Firm* — CHIESA, SHAHINIAN & GIANTOMASI PC

(57) ABSTRACT

A system and method are provided for determining the position and orientation of an implement on a work machine in a non-contact manner using machine vision. A 3D camera, which is mounted on the vehicle with a field of view that includes components on the implement (e.g., markers in some examples), determines a three-dimensional position in a local coordinate system of each of the components. A global positioning system in cooperation with an inertial measurement unit determines a three-dimensional position and orientation of the 3D camera in a global coordinate system. A computing system calculates a three-dimensional position in the global coordinate system for the components using the local three-dimensional positions of the components and the global three-dimensional position and orientation of the 3D camera. The position and orientation of the (Continued)

implement can then be calculated based on the calculated global three-dimensional positions of the components.

22 Claims, 9 Drawing Sheets

(51) Int. Cl.

| | | |
|---|---|---|
| *E02F 9/02* | (2006.01) | |
| *G01S 19/52* | (2010.01) | |
| *G01S 19/47* | (2010.01) | |
| *G06T 7/70* | (2017.01) | |
| *H04N 13/254* | (2018.01) | |
| *G06T 7/20* | (2017.01) | |
| *G06T 7/50* | (2017.01) | |
| *E02F 3/80* | (2006.01) | |
| *H04N 13/00* | (2018.01) | |

(52) U.S. Cl.
CPC .............. *E02F 9/26* (2013.01); *G01S 19/47* (2013.01); *G01S 19/52* (2013.01); *G06T 7/20* (2013.01); *G06T 7/50* (2017.01); *G06T 7/70* (2017.01); *H04N 13/254* (2018.05); *G06T 2207/10012* (2013.01); *G06T 2207/10048* (2013.01); *G06T 2207/30204* (2013.01); *G06T 2207/30252* (2013.01); *H04N 2013/0085* (2013.01)

(56) References Cited

U.S. PATENT DOCUMENTS

| | | | |
|---|---|---|---|
| 8,224,024 B2 | 7/2012 | Foxlin et al. | |
| 8,239,083 B2 | 8/2012 | Durkos et al. | |
| 8,412,418 B2* | 4/2013 | Kumagai .............. | G01C 11/06 |
| | | | 701/50 |
| 8,478,492 B2 | 7/2013 | Taylor et al. | |
| 8,983,739 B2 | 3/2015 | Faivre | |
| 9,002,565 B2 | 4/2015 | Jones et al. | |
| 9,139,977 B2* | 9/2015 | McCain .............. | G01B 11/022 |
| 9,347,205 B2* | 5/2016 | Kosarev .............. | E02F 3/845 |
| 9,674,458 B2 | 6/2017 | Teich et al. | |
| 9,790,666 B2* | 10/2017 | Kawamoto ............ | E02F 9/261 |
| 9,957,692 B2 | 5/2018 | Morin | |
| 10,030,358 B2 | 7/2018 | Wallace et al. | |
| 10,088,576 B2* | 10/2018 | Vasilyuk .............. | G01S 19/36 |
| 10,132,060 B2* | 11/2018 | Forcash ............... | E02F 9/2045 |
| 10,428,493 B2* | 10/2019 | Omelchenko ......... | E02F 3/7659 |
| 10,519,627 B2 | 12/2019 | Ge | |
| 10,781,575 B2* | 9/2020 | Lehmann ............. | E02F 9/2203 |
| 2005/0197756 A1* | 9/2005 | Taylor .................. | E02F 3/842 |
| | | | 701/50 |
| 2006/0184013 A1* | 8/2006 | Emanuel ............... | B66F 9/24 |
| | | | 600/426 |
| 2010/0121540 A1 | 5/2010 | Kumagai et al. | |
| 2011/0169949 A1* | 7/2011 | McCain ................ | E02F 3/847 |
| | | | 348/148 |
| 2012/0059554 A1* | 3/2012 | Omelchenko ...... | G01C 21/1654 |
| | | | 701/50 |
| 2013/0166143 A1* | 6/2013 | Seki .................... | G01S 19/47 |
| | | | 701/34.4 |
| 2014/0207331 A1* | 7/2014 | Kosarev .............. | E02F 9/264 |
| | | | 701/34.4 |
| 2015/0225923 A1* | 8/2015 | Wallace .............. | E02F 9/264 |
| | | | 701/50 |
| 2016/0231430 A1* | 8/2016 | Wilson ................. | G01S 19/51 |
| 2016/0251836 A1* | 9/2016 | Baba .................... | E02F 9/265 |
| | | | 701/50 |
| 2016/0326725 A1 | 11/2016 | Stratton | |
| 2016/0376772 A1* | 12/2016 | Kondo .................. | E02F 9/264 |
| | | | 701/34.4 |
| 2017/0089033 A1* | 3/2017 | Matsuyama .......... | E02F 9/2285 |
| 2017/0107688 A1* | 4/2017 | Fujii ..................... | G01C 15/12 |
| 2017/0268198 A1* | 9/2017 | Shimano ............... | E02F 3/32 |
| 2017/0268204 A1* | 9/2017 | Shimano ............... | E02F 3/435 |
| 2018/0051446 A1* | 2/2018 | Yoshinada ............ | E02F 9/264 |
| 2018/0144523 A1 | 5/2018 | Edelman et al. | |
| 2018/0245311 A1* | 8/2018 | Shike .................. | E02F 9/2045 |
| 2019/0032305 A1 | 1/2019 | Hageman et al. | |
| 2019/0176676 A1 | 6/2019 | Delp et al. | |
| 2019/0301144 A1* | 10/2019 | Kean .................... | E02F 9/265 |
| 2019/0329407 A1* | 10/2019 | Qi ........................ | G05D 1/0248 |
| 2019/0330825 A1* | 10/2019 | Tanimoto .............. | E02F 9/261 |
| 2020/0117201 A1 | 4/2020 | Oetken et al. | |
| 2020/0277758 A1* | 9/2020 | Edamura ............... | E02F 9/262 |
| 2020/0286255 A1 | 9/2020 | Tatarnikov et al. | |
| 2020/0370281 A1* | 11/2020 | Takaoka ................ | G05D 1/02 |
| 2021/0040708 A1* | 2/2021 | Kelley .................. | E02F 3/7627 |
| 2021/0079625 A1* | 3/2021 | Narikawa .............. | E02F 9/261 |
| 2021/0381203 A1* | 12/2021 | Itoh ...................... | H04N 7/181 |
| 2022/0065628 A1* | 3/2022 | Ishibashi .............. | E02F 9/265 |
| 2022/0134537 A1* | 5/2022 | Chadalavada Vijay Kumar ........ | |
| | | | B25J 9/023 |
| | | | 700/250 |

FOREIGN PATENT DOCUMENTS

| | | |
|---|---|---|
| JP | 2019521403 A | 7/2019 |
| WO | 2011005783 A4 | 3/2011 |
| WO | 2021021795 A1 | 2/2021 |

OTHER PUBLICATIONS

International Search Report and Written Opinion dated Jan. 11, 2023, in connection with International Patent Application No. PCT/RU2022/000106, filed Apr. 7, 2022, 8 pgs.

April Robotics Laboratory, "AprilTags Visual Fiducial System," retrieved online on Feb. 18, 2022, https://april.eecs.umich.edu/software/apriltag, 3 pgs.

"Grade Control for Dozers", Trimble, Inc., Retrieved on Sep. 27, 2019 from https://construction.trimble.com/products-and-solutions/grade-control-dozers, 14 pgs.

"Cat Grade with 3D for Dozers," Caterpillar, Retrieved on Sep. 27, 2019 from https://www.cat.com/en_US/products/new/technology/grade/grade/556020365684411.html, 3 pgs.

"Dozer-3D-MCMAX," Topcon, Retrieved on Sep. 27, 2019 from http://topconcare.com/en/hardware/grading-systems/dozer-3d-mcmax/, 1 pg.

Notice of Reasons for Refusal dated Sep. 8, 2023 in connection with Japanese Patent Application No. 2022-546467, 6 pgs. (including translation).

Extended European Search Report dated Oct. 20, 2023 in connection with European Patent Application No. 20917210.5, 9 pgs.

* cited by examiner

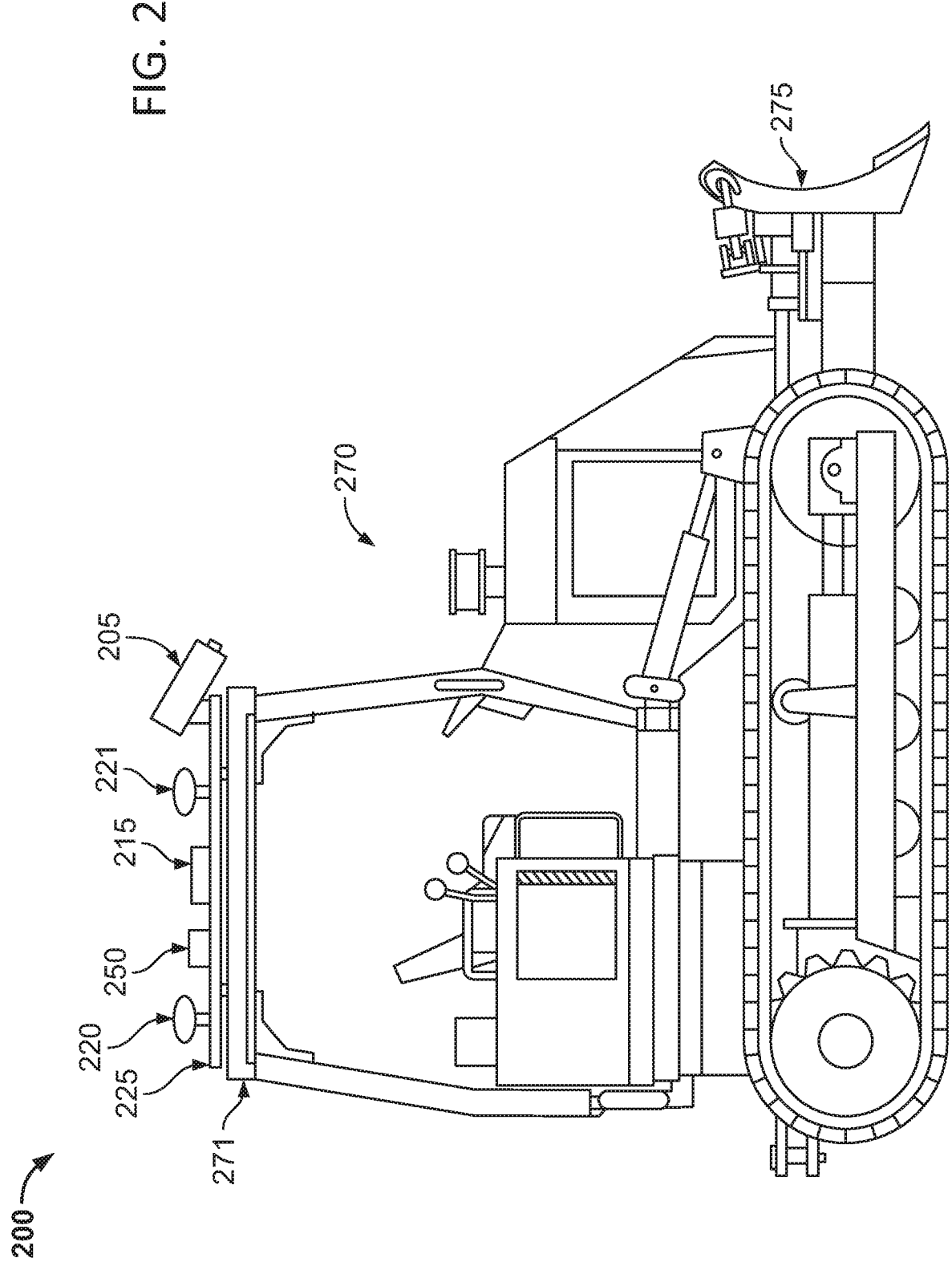

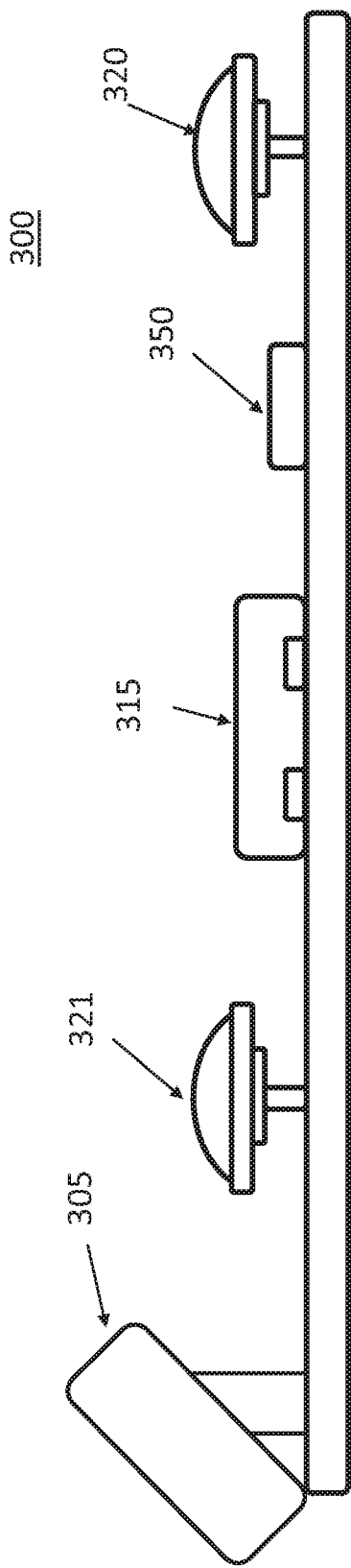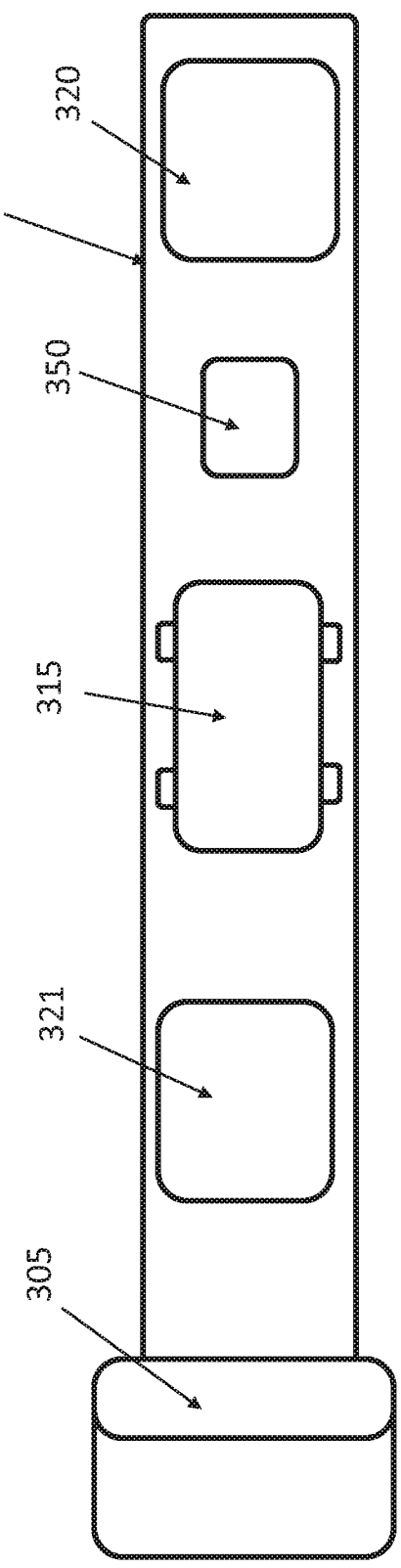

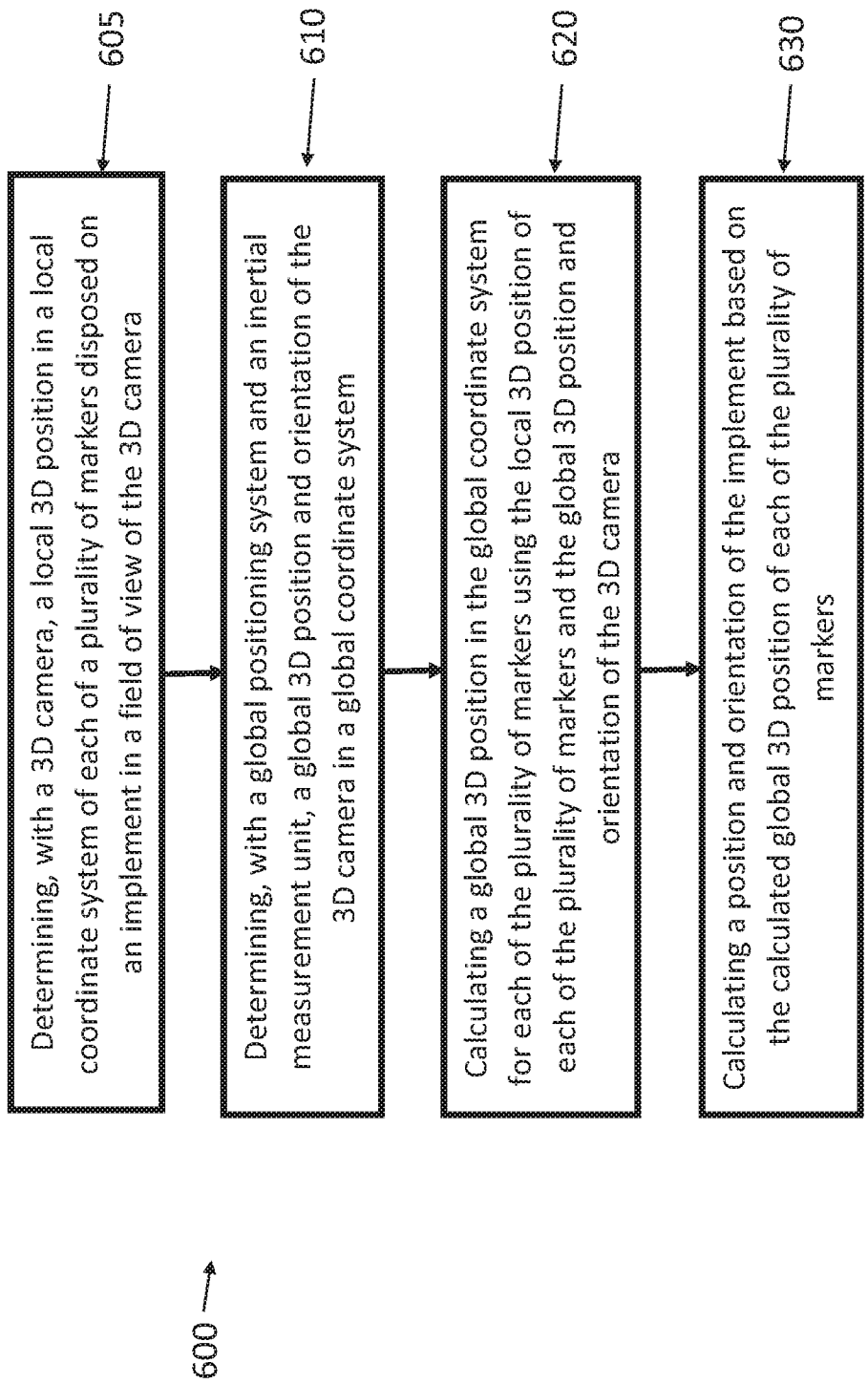

SYSTEM AND METHOD FOR CONTROLLING AN IMPLEMENT ON A WORK MACHINE USING MACHINE VISION

TECHNICAL FIELD

The present disclosure relates generally to implement control on work machines, and more particularly to effecting control of an implement on a work machine using a non-contact system and method for determining position of the implement.

BACKGROUND

Various types of earth-moving work machines used in construction and agricultural operations utilize implements to perform a range of typical worksite functions. As an example, work machines such as bulldozers, motor graders, excavators, tractors, and the like typically include a blade as an implement for performing a worksite function, e.g., using the blade of a bulldozer to level a section of the worksite to a desired grade. Increasingly, there is a demand for higher precision in many construction and agricultural operations to improve productivity and efficiency, reduce costs, and/or to improve the quality of the finished product.

To meet these demands, many operations of a work machine are now being automated to improve efficiency and precision, while also reducing the influence of human factors in the operations. A typical candidate for automation is the control system for controlling the blade of a bulldozer, motor grader or other similar work machines. For example, it is important to control blade position of a bulldozer or grader with a very high degree of accuracy (e.g., in the centimeter range) when performing high precision surface grading, especially when given time constraints to complete such tasks in a minimum amount of time.

Some arrangements for controlling blade position utilize global navigation satellite system (GNSS) antennas mounted on the body of the blade itself. GNSS receivers are then used to determine position and orientation of the blade in space. In other arrangements, linear stroke sensors are placed on the hydraulic blade control system with position and orientation of the blade then being calculated relative to the body of the work machine itself. In yet other arrangements, an inertial measurement unit (IMU) is installed on the body of the blade to determine position and orientation of the blade, which again is relative to the body of the work machine itself.

These and other arrangements require the mounting of elements (e.g., antennas, sensors, measurement devices, etc.) on the body of the implement, which leads to various issues that can adversely affect precision, reliability, efficiency and quality in operation of the work machine. For example, the blade of a bulldozer that comes into contact with a working surface is subjected to a significant amount of shock and vibration-induced effects. As a consequence, the operation of the mounted sensors and other sensitive components can be adversely affected, thereby leading to degradation in quality of the work output as well as equipment and component failure, breakage, and so on. Another disadvantage relates to the large number of sensors (or other elements) that must be installed on the blade, which creates a fragmented arrangement that is difficult and complex to integrate with existing, standard control systems.

SUMMARY

These and other issues are addressed, in accordance with the various embodiments, with a solution that determines the position and orientation of an implement on a work machine in a non-contact manner by using machine vision. In one or more embodiments, the solution may be an integrated design that can be installed without requiring significant changes to the standard configuration of the work machine and without requiring complex integration with existing control systems.

According to an embodiment, a system is provided for determining a position and orientation of an implement on a vehicle, the system including a three-dimensional (3D) camera, a global positioning system, an inertial measurement unit (IMU) and a computing system. The 3D camera is mounted to a structure on the vehicle such that the 3D camera has a field of view that includes a plurality of components (e.g., features) of the implement. The 3D camera is configured to determine a local three-dimensional position in a local coordinate system of each of the plurality of components (features). The global positioning system and IMU, which are also mounted to the same structure as the 3D camera, are configured to determine a global three-dimensional position and orientation of the 3D camera in the global coordinate system. The computing system is communicatively coupled to the 3D camera, the IMU and the global positioning system and is configured to calculate a global three-dimensional position in the global coordinate system for each of the plurality of components (of the implement) using the local three-dimensional position of each of the plurality of markers and the global three-dimensional position and orientation of the 3D camera. The computing system is also configured to calculate a position and an orientation of the implement based on the calculated global three-dimensional position for each of the plurality of components.

Other embodiments include a method and a computer program embodied on a non-transitory computer-readable medium, for determining a position and orientation of an implement on a vehicle, in accordance with the system described above.

According to one or more embodiments, the 3D camera is a 3D stereo camera. In various embodiments, the plurality of components comprise a plurality of markers located on the implement, the plurality of markers including at least one of particular color-based or particular shape-based features. According to an embodiment, the system further comprises a near-infrared illuminator that is configured to illuminate the plurality of components (e.g., markers) for enhanced image capture by the stereo camera. In one or more embodiments, the global positioning system, the IMU, and the stereo camera are positioned in a co-located arrangement on a structure which can be mounted to a roof surface on a cabin of the vehicle. According to another embodiment, the computing system is further configured to calculate a height and an inclination of the implement based on the calculated position and orientation of the implement. In other embodiments, the vehicle is a track-type work machine including a left track and a right track, and the 3D camera is configured to capture images of movements of the left track and the right track that are within the field of view of the 3D camera. In these embodiments, the computing system is configured to calculate track speed as a function of measured speed of the left track and measured speed of the right track based on the captured images. In this example, the computing system can be configured to calculate a slippage ratio based on a comparison of the calculated track speed and a work machine speed measured by the global positioning system. In another embodiment, the implement is an earth-moving blade and the stereo camera is configured to detect a capacity of blade load exceeding the height of the blade based on captured images of the blade within the field of view of the stereo camera.

These and other advantages will be apparent to those of ordinary skill in the art by reference to the following detailed description and the accompanying drawings.

BRIEF DESCRIPTION OF THE DRAWINGS

FIG. 2 is a side view of an earth-moving work machine in accordance with one or more embodiments;

FIG. 3A is a side view and FIG. 3B is a top view of a mountable system in accordance with one or more embodiments;

FIG. 6 is a flowchart illustrating a method for determining a position of an implement on a vehicle in accordance with one or more embodiments;

DETAILED DESCRIPTION

Various illustrative embodiments will now be described more fully with reference to the accompanying drawings in which some of the illustrative embodiments are shown. It should be understood, however, that there is no intent to limit illustrative embodiments to the particular forms disclosed, but on the contrary, illustrative embodiments are intended to cover all modifications, equivalents, and alternatives falling within the scope of the claims. Where appropriate, like numbers refer to like elements throughout the description of the figures. It will be understood that, although terms such as first, second, etc. may be used herein to describe various elements, these elements should not be limited by these terms. These terms are only used to distinguish one element from another. For example, a first element could be termed a second element, and, similarly, a second element could be termed a first element, without departing from the scope of illustrative embodiments. As used herein, the term "and/or" includes any and all combinations of one or more of the associated listed items.

According to the various embodiments described herein, a non-contact measurement solution can be useful for controlling the operation of an implement (blade) of a work machine. As will be described in further detail below, a system and method according to the various embodiments utilizes machine vision for determining the position and orientation of the implement (e.g., for further estimating height and inclination), which enables more precise control of the implement during worksite operations. Additionally, the speed of the tracks of a work machine can be estimated by using machine vision to capture images of the tracks of the work machine in motion. Machine vision can also be advantageously utilized to detect whether a capacity of blade load (e.g., soil being moved) exceeds the height of the blade based on captured images, as well as for object detection/recognition on the machine travel path which can also be useful for collision avoidance. Any number of these tasks/functions can also be performed in parallel and/or simultaneously.

Figure 1:
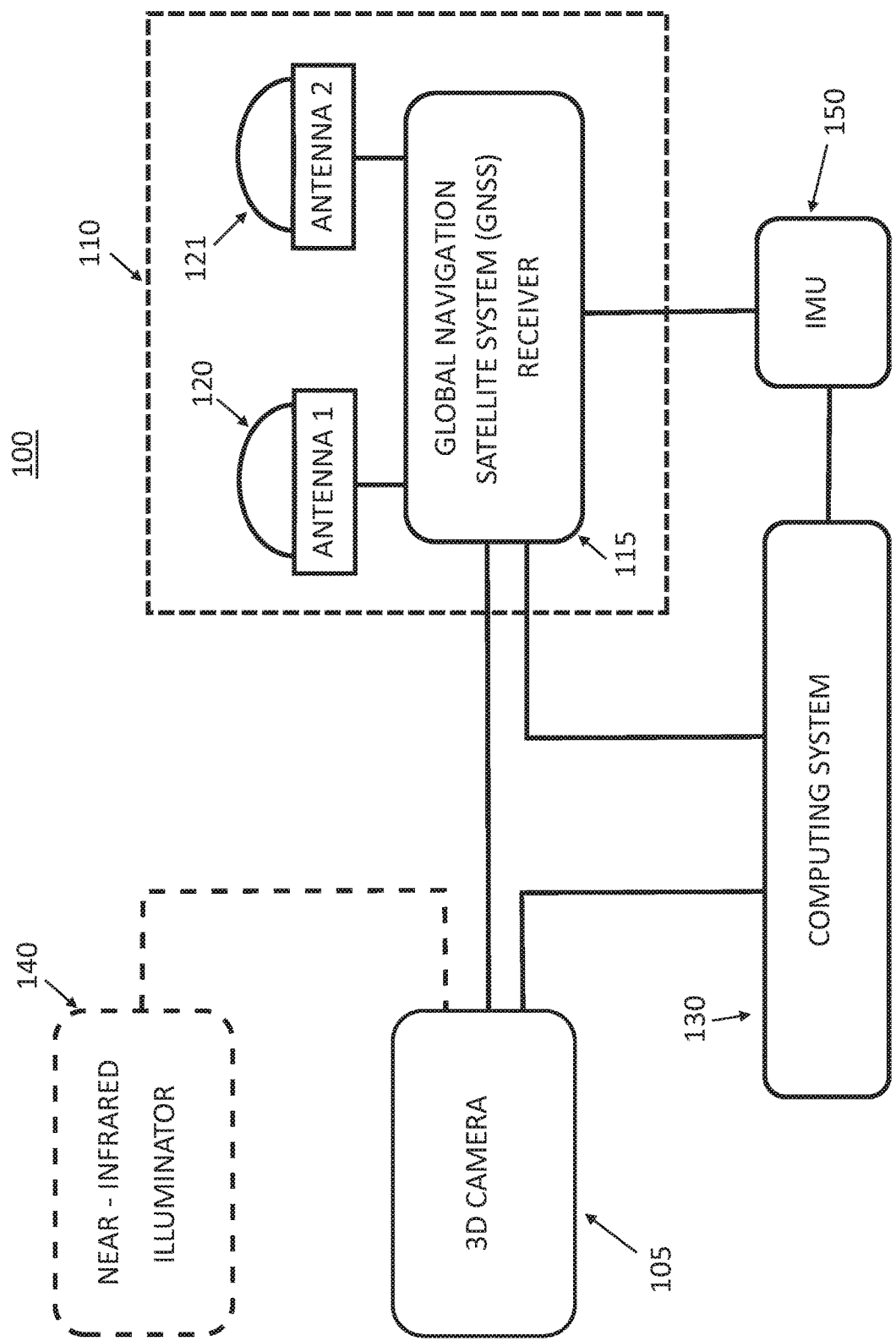
FIG. 1 is a block diagram illustrating a system for determining a position of an implement on a vehicle in accordance with one or more embodiments.

FIG. 1 shows system 100 in accordance with various embodiments. System 100 includes a three-dimensional (3D) camera 105, a global positioning system 110, an inertial measurement unit (IMU) 150 and computing system 130. In an embodiment, global positioning system 110 includes a Global Navigation Satellite System (GNSS) receiver 115 and a plurality of antennas, shown in FIG. 1 as antenna 120 and antenna 121. GNSS receiver 115 is communicatively coupled to 3D camera 105 and IMU 150. Computing system 130 is communicatively coupled to 3D camera 105, GNSS receiver 115 and IMU 150.

According to some embodiments, system 100 may also include near-infrared (NIR) illuminator 140 to ensure accuracy regardless of ambient lighting conditions, which will be described in further detail below. It should be noted that any number of NIR illuminators (e.g., one or more) may be used for this purpose and, as such, the embodiments shown and described here are only meant to be illustrative.

As shown, GNSS receiver 115 is a dual-antenna GNSS receiver receiving GNSS signals via antennas 120 and 121. In some embodiments, antenna 120 may be a main antenna while antenna 121 may be a slave antenna, which is a typical configuration for a dual-antenna GNSS receiver. According to one or more embodiments, IMU 150 may be integrated into the main antenna, e.g., antenna 120. For example, one of several exemplary ways for integrating these components and functions is described in U.S. Pat. No. 10,088,576, entitled "GNSS Antenna with an Integrated Antenna Element and Additional Information Sources", to N. Vasilyuk et al. According to other embodiments, IMU 150 may be positioned external to global positioning system 110, and located on a common (e.g., rigid) platform (not shown) with 3D camera 105 and GNSS antennas 120 and 121. Dual-antenna GNSS receiver 115 is used to measure two attitude angles of the common platform. In particular, these angles are equal to the angular coordinates of the baseline passing through the phase centers of both antennas 120 and 121. A third angle, which is the rotation angle around the baseline, can be measured using IMU 150. Accordingly, the combination of GNSS receiver 115 with IMU 150 allows for the measurement of the 3D position and orientation of the common platform.

3D camera 105 is capable of capturing 3D images to provide machine vision functionality. In one embodiment, 3D camera 105 may be a 3D stereo camera that employs stereo vision to extract 3D information from captured digital images. For example, by comparing information from two vantage points, 3D information can be extracted by examining the relative positions of objects in the two vantage points.

According to one or more embodiments, a 3D camera 105 (e.g., referred in this example as 3D stereo camera 105) may include image sensors with a global shutter, which would be beneficial for higher precision machine vision. In particular, a global shutter can help prevent or mitigate the so-called "jelly effect" that can be caused by shock and vibration, which is commonly encountered in applications involving earth-moving work machines. According to certain embodiments, 3D stereo camera 105 may include various features and functionality including, but not limited to: black and white imaging capability; speeds of approximately 50 frames per second (FPS) or more; pixel sizes of approximately 2.5 μm or more; and/or high definition (HD) resolution capability (e.g., 3 MP resolution). Additionally, 3D stereo camera 105 would have capability to communicate and transfer information between computing system 130 and GNSS receiver 115. In certain embodiments where NIR illumination is provided by NIR illuminator 140 (which will be described in further detail below), 3D stereo camera 105 may incorporate an infrared long-pass or passband filter for active NIR illumination support. For example, in some examples, such a filter may have a NIR passband range of 800-900 nm to cut off certain spectrums (e.g., the visible and IR spectrums) in a scenario when working in NIR range. Various 3D stereo cameras can be suitably used in the embodiments described herein. As such, the above examples are only meant to be illustrative and not limiting in any manner.

Additionally, 3D image acquisition for machine vision algorithms can be obtained with other variants of 3D cameras as alternatives to a stereo camera. For example, 3D camera 105 may be implemented with a time-of-flight (TOF) camera, which is a range imaging camera system that employs time-of-flight techniques to resolve distance between the camera and the subject for each point of the image. In yet other embodiments, any other LIDAR (Light Detection and Ranging) systems may also be suitably used as 3D camera 105 in the embodiments described herein.

FIG. 2 shows a side view of an earth-moving work machine 270, which includes system 200 for determining a position of implement (e.g., blade) 275 in accordance with one or more embodiments. Like elements will be referenced with like reference numerals for ease of description in the various embodiments. As shown in FIG. 2, system 200 includes 3D camera 205, IMU 250, GNSS receiver 215, first antenna 220 and second antenna 221, which corresponds to the configuration of system 100 (FIG. 1). In this example, mounting structure 225 (e.g., a common platform) is a unitary structure on which the elements of system 200 (e.g., 3D camera 205, IMU 250, GNSS receiver 215, antennas 220 and 221) are mounted or otherwise disposed. In one embodiment, mounting structure 225 may be mounted onto the roof of cabin 271 of earth-moving machine 270. In this manner, system 200 is arranged as an integrated, all-in-one configuration on a common platform/housing structure (e.g., co-located arrangement of components) that can be installed without requiring significant changes to the standard configuration of the earth-moving work machine 270. The embodiment shown in FIG. 2 is just one example of a configuration for deploying system 200. Various other configurations and mounting arrangements are contemplated by the teachings herein.

FIG. 3A and FIG. 3B are side and top views to further illustrate the deployment and configuration of system 300 in accordance with one or more embodiments. Similar to system 100 (FIG. 1) and system 200 (FIG. 2), system 300 includes 3D camera 305, GNSS receiver 315, first antenna 320 and second antenna 321, and IMU 350, which are mounted on mounting structure 325 for further attachment and/or mounting onto a work machine (not shown). As noted previously, IMU 350 may also be integrated in the first (main) antenna 320 in one or more embodiments. As such, the positioning and integration of the various elements on mounting structure 325 shown in FIGS. 3A and 3B (and other figures) is meant to be illustrative and not limiting in any manner.

Figure 4:
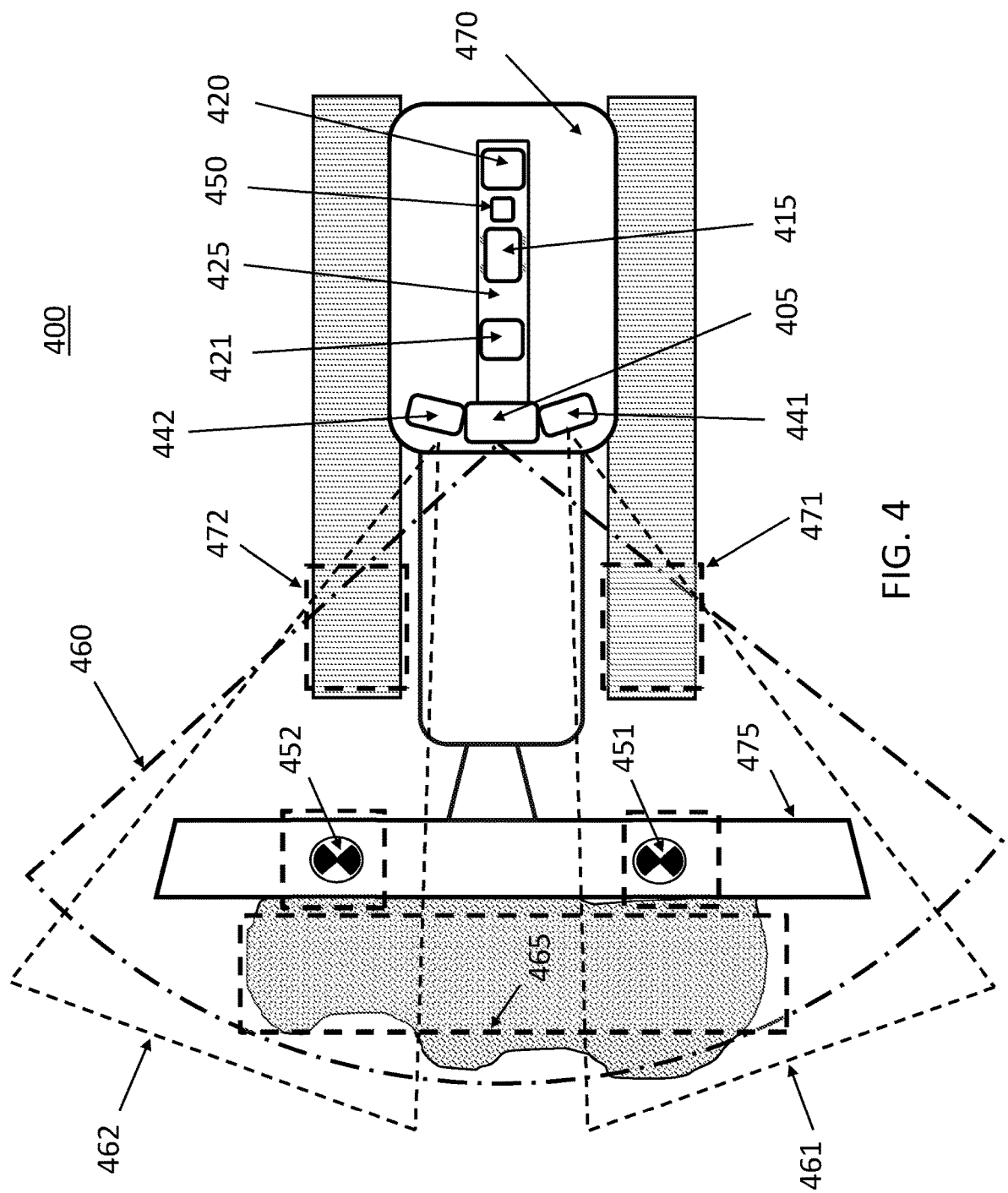
FIG. 4 is a top view of an earth-moving work machine in accordance with one or more embodiments.

FIG. 4 is a top view of earth-moving work machine 470 showing various features according to one or more embodiments. Similar to the configurations shown in FIGS. 1-3, earth-moving work machine 470 is shown to include implement (e.g., blade) 475 and system 400 includes 3D camera 405, GNSS receiver 415, first antenna 420, second antenna 421, and IMU 450, which are mounted onto structure 425 that is further mounted/attached to the roof of earth-moving machine 470. As shown in this embodiment, a first marker 451 and a second marker 452 are disposed (e.g., mounted, attached, rigidly fixed, etc.) to a top surface of blade 475. 3D camera 405 includes a field of view 460 that includes a view of markers 451 and 452. The configuration shown in FIG. 4 is meant to be illustrative and not limiting in any manner. For example, any number of markers may be positioned on blade 475 and utilized according to the principles of the disclosure. Field of view 460 also includes a view 465 of material that is in contact with blade 475, e.g., soil/sand/gravel/clay, etc., that is being moved by earth-moving work machine 470.

As described, 3D camera 405 is mounted to structure 425 such that it has a field of view that includes a plurality of markers, such as markers 451 and 452 as shown in FIG. 4. It is also contemplated that various other features of the implement (e.g., blade 475) may also be suitably used to facilitate determining the position and orientation of the implement. Such features may be components, elements, parts and so on, of the working implement itself (e.g., caution decals, blade hood, shims, threaded anchors, etc.), or such features may be components, elements, parts, and so on, which have been added (e.g., installed, etc.) onto the implement, such as markers and the like. In some embodiments, such features may include particular colors, shading, shapes or various combinations thereof, which may aid in the process of being located and identified with machine vision using the 3D camera (e.g., such features may have colors, shapes, etc. that make them easier to find and identify). Accordingly, the use of markers or other components of the implement (e.g., blade 475) may be suitably used for the various embodiments. For ease of description, the term "components" is intended to broadly encompass any such features that are used for these purposes. Furthermore, various embodiments described herein may use the example of markers, which is meant to be illustrative and not limiting in any manner.

As described previously, according to some embodiments, system 100 may also include one or more near-infrared (NIR) illuminators 441 and 442 to ensure accuracy regardless of ambient lighting conditions. For example, ambient light can impact system performance in some environments and/or conditions (e.g., ambient light may interfere or otherwise distort image capture by 3D camera 405). To counter the potential problems of acquiring images of markers 451 and 452 in certain ambient lighting conditions, one or more near-infrared (NIR) illuminators can be used to irradiate markers 451 and 452, thereby enhancing the illumination of the markers for image capture by 3D camera 405 configured for NIR range light reception. In one or more embodiments, zones of NIR illumination 461 and 462 would cover possible locations of markers 451 and 452. In one or more embodiments, zones 461 and 462 may also cover areas of left track 471 and right track 472 for track speed estimation with the assistance of 3D camera 405, which will be described in further detail below. Active pulse illumination of markers 451 and 452 (and left and right tracks 471 and 472) in the NIR range may beneficially increase the frequency of calculation of the marker positions and track speed by up to 100 Hz, thereby improving the robustness of system performance (e.g., by making the calculations invariant to the intensity of ambient light).

Figure 5A:
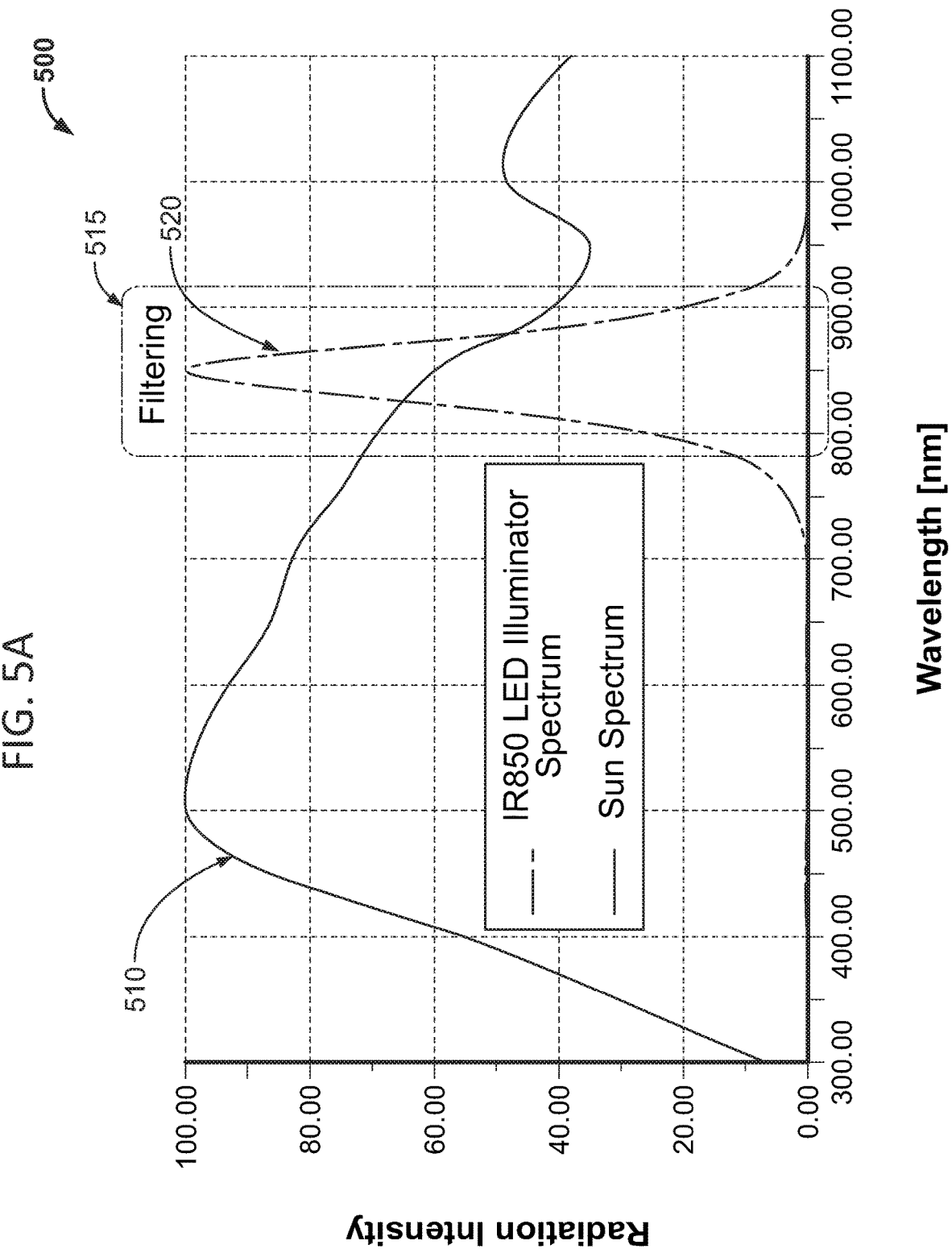
FIG. 5A shows a graphical plot of spectrum-related features and FIG. 5B shows a graphical plot of timing-related features of NIR illumination according to one or more embodiments.
Figure 5B:
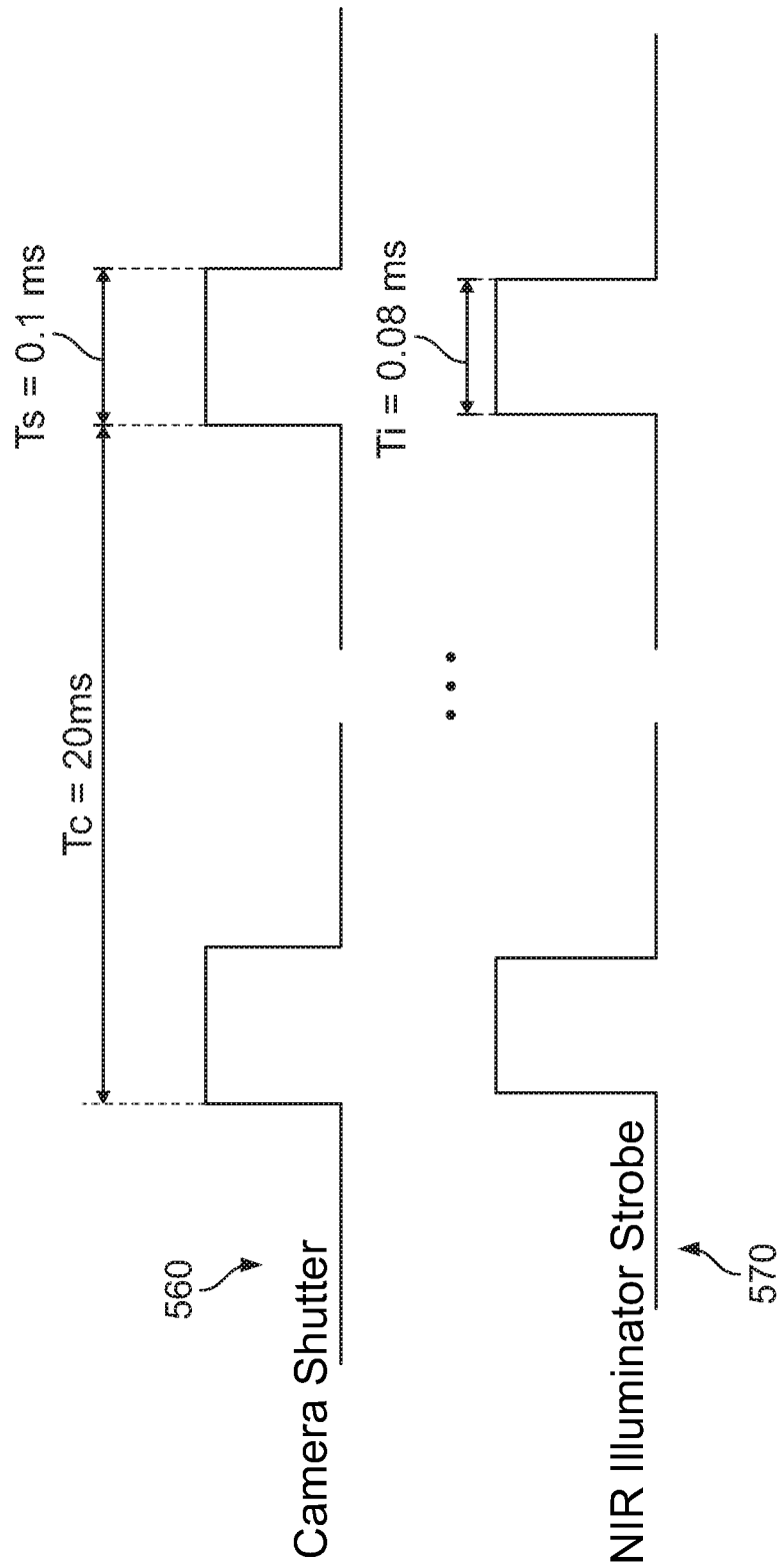

FIGS. 5A and 5B illustrate how NIR illumination can be advantageously applied in the various embodiments described herein, e.g., such as system 400. As described, the quality and reliability of the machine vision system can be significantly affected by sunlight. For example, the intensity, direction, and angle of arrival of sunlight can change significantly during operation of the system 400, which in turn may place demands on system 400 to adapt to such changes (e.g., in some cases, continuously) in order to maintain certain levels of performance. In some cases, ambient light can cause significant degradation of the accuracy of the machine vision system. For example, in certain scenarios, the markers 451 and 452 markers located on opposite edges of blade 475 may experience different lighting conditions (e.g., in some cases, significantly). The markers 451 and 452 (one or both) may be overexposed, which may lead to the erosion of its shape (in images), or underexposed, which may lead to degradation of accuracy for its positioning.

To mitigate or eliminate the influence of sunlight, it is contemplated in one or more embodiments to use the near infrared (NIR) light range with a sufficiently narrow working area of wavelengths (as will be described with reference to FIG. 5A) and active illumination with the use of a pulsed illuminator that may be configured to emit light only when the camera shutter of 3D camera 405 is open (as will be described with reference to FIG. 5B).

Referring to plot 500 shown FIG. 5A, line 510 represents a plot of radiation intensity and wavelength for the sun spectrum (e.g., sunlight). Line 520 represents a plot of radiation intensity and wavelength for the spectrum of an LED illuminator that may be used as an NIR illuminator according the one or more embodiments (e.g., NIR illuminator 140 (FIG. 1) for use in system 400 (FIG. 4), for example. In this embodiment, the 3D camera 405 includes a passband filter with a passband represented by line 515. In this manner, to the system can receive NIR range light, while cutting off other spectrum components. In the example shown in FIG. 5A, the passband filter has a passband range of approximately 800-900 nm, which serves to cut off certain spectrums (e.g., the visible and IR spectrums), thereby facilitating operation in the NIR range. In this manner, portions of the sun spectrum (e.g., a significant art of the sunlight) can be prevented from passing thru the lens of 3D camera 405.

Various design considerations may be taken into account for choosing the design and operational parameters of the NIR illuminator, e.g., in one example, the power level of the pulsed light for the NIR illuminator may be chosen to ensure relative dominance (or equality) to the intensity of sunlight on a clear day. For example, in the example shown in FIG. 5A, in order to prevail over bright sunlight, the power of the NIR illuminator (light source) according to one embodiment may be approximately in the range of 100 W to illuminate a surface area of one square meter. If the NIR illuminator operates in a strobe mode, power consumption can be reduced to acceptable levels in the range of approximately 5 to 7 W in certain embodiments. The zones of NIR illumination 461 and 462 (which may also be referred to as NIR illuminator beams 461 and 462) could then be formed in such a manner to illuminate the entire area of possible locations for markers 451 and 452, in one example.

According to another aspect, NIR illuminators 441 and 442 used in system 400 may be synchronized with the shutter operation of 3D camera 405, e.g., such that the illumination of markers 451 and 452 may occur only when the shutter of 3D camera 405 is opened for image exposition. As shown in FIG. 5B, the timing associated with the shutter of the 3D camera is represented by line 560, while the timing associated with the operation of the NIR illuminator (e.g., in strobe mode) is represented by line 570. As shown in this illustrative embodiment, as one example, the duration of the NIR illuminator pulse is approximately 0.08 ms with a period of approximately 20 ms, while the 3D camera operates with an update rate of 50 frames per second (e.g., every 20 ms) with a shutter (exposition) time of approximately 0.1 ms. Additionally, in this example, the strobe (pulse) mode allows for significantly reducing the power consumption of the NIR illuminator. It should be noted that the examples shown in FIGS. 5A and 5B (associated values, ranges, etc.) are meant to be illustrative and not limiting in any manner.

FIG. 6 shows method 600 for determining a position of an implement on a vehicle in accordance with one or more embodiments, which will be described in the context of the system configurations shown in FIGS. 1-4. For ease of description, all examples will refer to system configuration 400 shown in FIG. 4 unless indicated otherwise.

As shown in step 605, 3D camera 405 is used for determining a local 3D position in a local coordinate system of each of a plurality of components of the implement (e.g., a plurality of markers that are disposed on the implement in various embodiments) and which are in a field of view of the 3D camera 405. More specifically, 3D camera 405 is focused on the implement (e.g., bulldozer blade 475) with markers 451 and 452 being within field of view 460. With the images of markers 451 and 452 captured by 3D camera 405, the 3D position of the markers can then be determined in the camera's local coordinate system. In one embodiment in which 3D camera 405 is a 3D stereo camera, the base (of 3D stereo camera 405) is 15 cm and a 3MP video matrix is used to obtain sub-centimeter accuracy of marker 451 and 452 positioning, e.g., up to 3 m distance from 3D camera 405. The horizontal viewing angle of the 3D camera 405 is approximately 90 degrees.

In step 610, the global positioning system (e.g., GNSS receiver 415 and dual antennas 420 and 421) and IMU 450 are used for determining a global 3D position and a global 3D orientation, respectively, of the 3D camera 405, wherein the global 3D position and global 3D orientation are in a global coordinate system. Accordingly, the global 3D position and orientation of the 3D camera 405, which is mounted on common platform 425, and the work machine 470 are therefore obtained.

According to the embodiments described herein, the accuracy of determining the position of GNSS receiver 415 can be approximately 1 cm (real-time kinematic (RTK)), the accuracy of determining the slope angles (e.g., pitch and roll) is approximately 0.1 degrees, and the accuracy of determining the heading angle depends on the distance between antennas 420 and 421 antennas (e.g., for half-meter antenna base, the accuracy is approximately 0.5 degrees).

In step 620, by knowing the global 3D position and orientation of 3D camera 405 in the global coordinate system, the global 3D position of markers 451 and 452 can be calculated (e.g., recalculated from the local camera's coordinate system to the global coordinate system). The re-computation (calculation) of local marker coordinates in the global coordinate system is possible when knowing both the 3D position and the 3D orientation of the 3D camera 405.

In step 630, the position and orientation of the implement is calculated (by computing system 130) based on the calculated global three-dimensional position of each of the plurality of markers.

Figure 7:
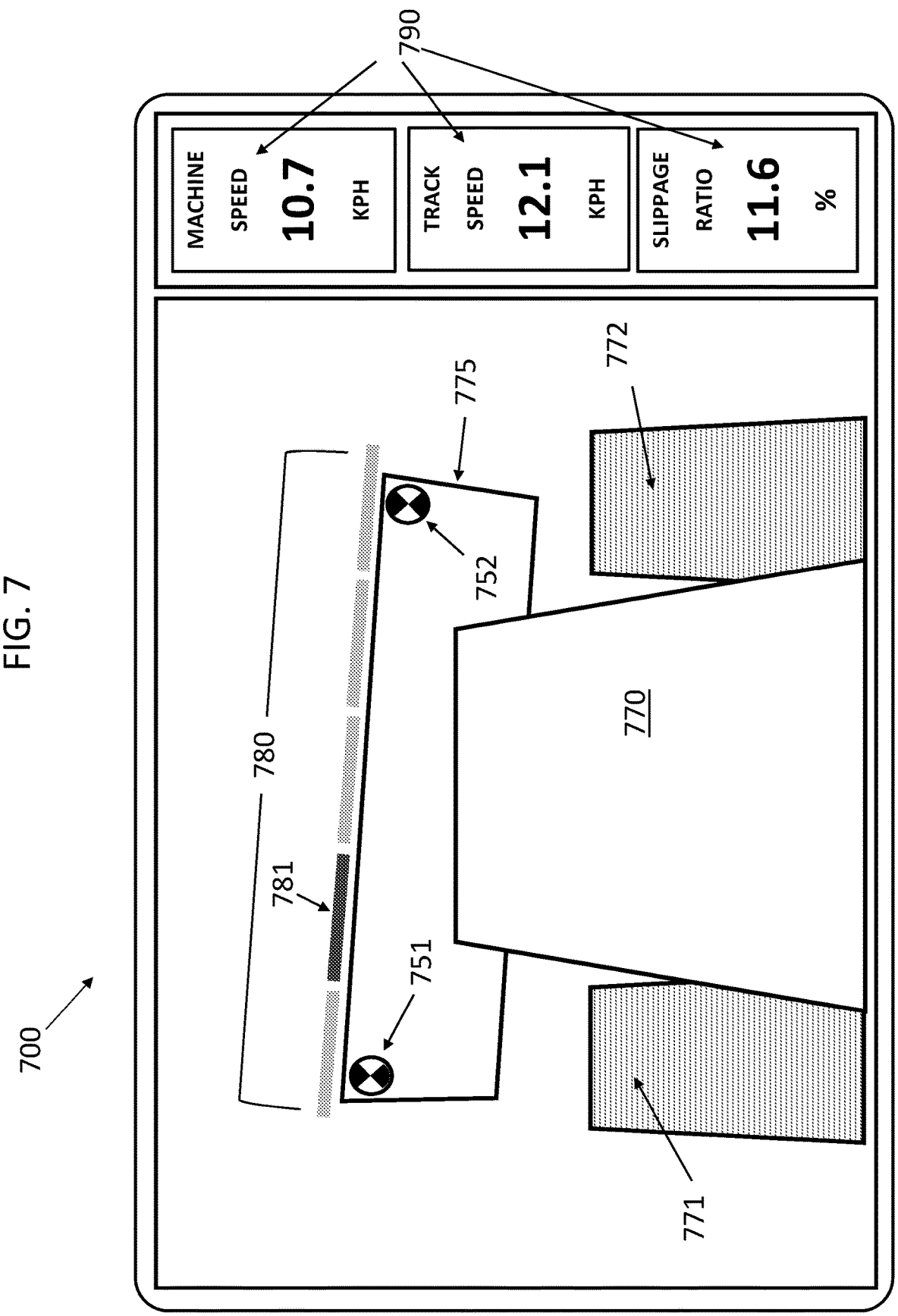
FIG. 7 is a perspective view of a track-based earth-moving machine illustrating features of the system for measuring speed of the tracks and detecting blade load in accordance with one or more embodiments.

In addition to determining the position and orientation of an implement, machine vision according to the various embodiments can be used for other functions (e.g., track speed, blade load, etc.) relating to the operation of a track-type work machine including a left track (e.g., a first track) and a right track (e.g., a second track). FIG. 7 is a perspective view of an earth-moving machine illustrating features of the system for measuring speed of the earth-moving machine caterpillars (track-based movement mechanism) and detecting blade load in accordance with one or more embodiments. More specifically, configuration 700 shows a display view (from the operator's perspective) in which information from the system is simultaneously displayed regarding: (1) position of the blade; (2) track speed of the work machine; (3) speed of the work machine; (4) slippage ratio and (5) segments that reflect the blade load.

More specifically, machine vision may be used to estimate caterpillar (track) speed, which is not the same as vehicle (work machine) speed when there is slippage effect during vehicle motion. Vehicle (work machine) speed can be estimated by the GNSS system (e.g., global positioning system 110) mounted on work machine 770 and track speed can be estimated by the 3D camera (405). The difference between speeds (work machine and caterpillar track speeds) reflects the slippage effect caused by (bulldozer) loading. The greater the difference between work machine and caterpillar track speeds, the greater the slippage.

In operation, a vehicle operator can mitigate or prevent (e.g., manually or automatically) large amounts of slippage by reducing blade loading (e.g., by raising the blade). As an example, if the slippage ratio is calculated according to the function:

Slippage Ratio=$100*(Vt-Vm)/Vt$, where Vt is track speed and Vm is work machine speed, then the slippage ratio can be reduced (e.g., to maintain it on level 5% or less) by controlling the blade position on the work machine, e.g., by raising the blade, which reduces blade loading. Thus having information such as machine speed, track speed, and slippage ratio can be advantageously used during operation of the work machine.

Referring to FIG. 7, work machine 770 includes blade 775 and markers 751 and 752, which are consistent with the configuration shown in FIG. 4. Additionally, work machine 770 is shown to have a caterpillar mechanism comprising left track 771 and right track 772. Section 780 (shown visually in multiple segments) represents the position of the blade, as presented to the operator, based on measurements and calculations being made, in accordance with the description in the preceding embodiments, while work machine 770 is in motion. As shown, segment 781 of section 780 corresponds to a portion of blade 775 in which the load (e.g., soil) has passed above/over the blade height. According to the embodiments described herein, presentation of this information, relative to the display of the blade position, can be beneficial for the operator or to facilitate an automated dozer system to control blade 775 and/or movement of the work machine 770 accordingly.

According to another aspect of the disclosed embodiments, speed of the work machine (dozer) 770, the caterpillar track speed (left track 771 and right track 772), and the slippage ratio are shown in section 790.

For example, tracks on a work machine, such as a bulldozer, have pronounced vertical patterns (e.g., grousers). According to one or more embodiments, the computing system may be configured to select (on the camera image) only the area related to caterpillar location. The computing system would then normalize the image (e.g., up to 16 gradations of brightness at 4 bit per pixel, for example).

Next, the position of track grousers may be estimated using a percentile method. For example, an estimation is executed for a sequence of camera frames and the speed of track grousers is computed based on their position shift divided on the frame period. By using a 3D camera, caterpillar height deviation/fluctuation can be compensated during motion (e.g, because caterpillar tension is not constant in time and the surface of the caterpillar cannot be approximated by a flat surface because it has variable sag).

According to another aspect of the embodiments, blade load control is considered. For example, an upper edge of dozer blade 775 can be estimated with the help of the already-detected and localized markers. Then, the depth map in the area above dozer blade 775 can be calculated. Then, any objects in this area can be detected, and if some objects have a distance (relative to the camera) that are similar to blade distance, then such objects can be marked as obstacle (s) and indicated as blade overloading.

Figure 8:
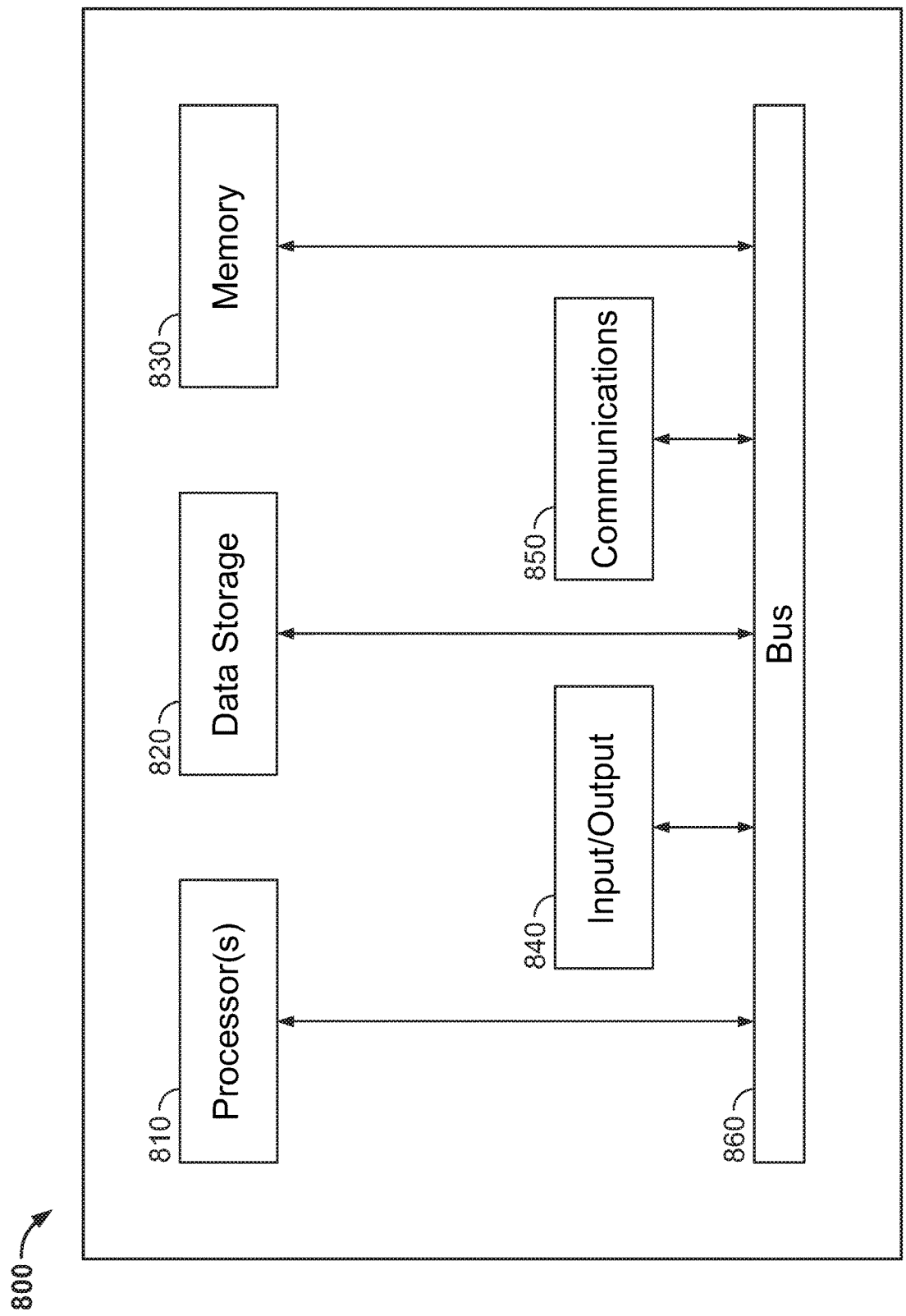
FIG. 8 shows a high-level block diagram of a computing system according to one or more embodiments.

As detailed above, the various embodiments herein can be embodied in the form of methods and apparatuses for practicing those methods. The disclosed methods may be performed by a combination of hardware, software, firmware, middleware, and computer-readable medium (collectively "computing system") installed in and/or communicatively connected to a user apparatus. FIG. 8 is a high-level block diagram of an exemplary computing system 800 that may be configured to implement the method for determining a position of an implement on a vehicle in accordance with the various embodiments herein.

Computing system 800 comprises a processor 810 (or processors) operatively coupled to a data storage device 820 and a memory 830. Processor 810 controls the overall operation of computing system 800 by executing computer program instructions that define such operations. Communications bus 860 facilitates the coupling and communication between the various components of computing system 800. The computer program instructions may be stored in data storage device 820, or a non-transitory computer readable medium, and loaded into memory 830 when execution of the computer program instructions is desired. Thus, the steps of the disclosed method (see, e.g., FIG. 5 and the associated discussion herein above) can be defined by the computer program instructions stored in memory 830 and/or data storage device 820 and controlled by processor 810 executing the computer program instructions. For example, the computer program instructions can be implemented as computer executable code programmed by one skilled in the art to perform the illustrative operations defined by the disclosed method. Accordingly, by executing the computer program instructions, processor 810 executes an algorithm defined by the disclosed method. Computing system 800 also includes one or more communication interfaces 850 for communicating with other devices via a network (e.g., a wireless communications network) or well-known communications protocol(s). For example, such communication interfaces may be a receiver, transceiver or modem for exchanging wired or wireless communications in any number of well-known fashions. Computing system 800 also includes one or more input/output devices 840 that enable user interaction with computing system 800 (e.g., camera, display, keyboard, mouse, speakers, microphone, buttons, etc.).

Processor 810 may include both general and special purpose microprocessors, and may be the sole processor or one of multiple processors of computing system 800. Processor 810 may comprise one or more central processing units (CPUs), for example. Processor 810, data storage device 820, and/or memory 830 may include, be supplemented by, or incorporated in, one or more application-specific integrated circuits (ASICs) and/or one or more field programmable gate arrays (FPGAs).

Data storage device 820 and memory 830 each comprise a tangible non-transitory computer readable storage medium. Data storage device 820, and memory 830, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 840 may include peripherals, such as a camera, printer, scanner, display screen, etc. For example, input/output devices 840 may include a display device such as a cathode ray tube (CRT), plasma or liquid crystal display (LCD) monitor for displaying information to the user, a keyboard, and a pointing device such as a mouse or a trackball by which the user can provide input to computing system 800.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing merely illustrates the principles of the disclosure and is to be understood as being in every respect illustrative and exemplary, but not restrictive. It will thus be appreciated that those skilled in the art will be able to devise various arrangements that, although not explicitly described or shown herein, embody the principles of the disclosure and are included within its spirit and scope. For example, although the embodiments described herein are presented in the context of construction applications (e.g., earth-moving, excavating, etc.), it should be appreciated that the embodiments can be applied in various other contexts as well (e.g., agricultural, mining, and so on). For example, the implement of a tractor or other farming vehicle can be controlled in a similar manner as an earth-moving work machine, e.g., use of machine vision to estimate the position and orientation of the tractor implement. Machine vision can also be advantageously used for planting (e.g., row tracking and steering) by capturing images of the underlying surface in front of a tractor and estimating surface relief or plant rows (beds).

Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A system for determining a position and orientation of an implement on a vehicle, comprising:
   a three-dimensional (3D) camera mounted to a structure on the vehicle such that the 3D camera has a field of view that includes a plurality of components of the implement, the 3D camera being configured to determine a local three-dimensional position in a local coordinate system of each of the plurality of components;
   a global positioning system and inertial measurement unit mounted to the structure, the global positioning system and inertial measurement unit being configured to determine a global three-dimensional position and orientation of the 3D camera in a global coordinate system; and
   a computing system communicatively coupled to the 3D camera, the inertial measurement unit and the global positioning system, the computing system being configured to:
      calculate a global three-dimensional position in the global coordinate system for each of the plurality of components using the local three-dimensional position of each of the plurality of components, the global three-dimensional position of the 3D camera, and the global three-dimensional orientation of the 3D camera; and
      calculate a position and an orientation of the implement based on the calculated global three-dimensional position for each of the plurality of components.

2. The system of claim 1, wherein the 3D camera is a stereo camera.

3. The system of claim 1, wherein the plurality of components comprise a plurality of markers located on the implement, the plurality of markers including at least one of particular color-based or particular shape-based features.

4. The system of claim 1, wherein the local coordinate system is associated with the 3D camera.

5. The system of claim 1, further comprising a near-infrared illuminator configured to illuminate the plurality of components for enhanced image capture by the 3D camera.

6. The system of claim 1, wherein the computing system is further configured to calculate a height and an inclination of the implement based on the calculated position and orientation of the implement.

7. The system of claim 1, wherein the global positioning system and the inertial measurement unit are integrated with at least one antenna.

8. The system of claim 1, wherein the structure is mounted to a roof surface on a cabin of the vehicle, and wherein the 3D camera, the global positioning system and the inertial measurement unit are positioned in a co-located arrangement on the structure.

9. The system of claim 8, wherein the vehicle is a work machine and the implement is an earth-moving implement.

10. The system of claim 9, wherein the earth-moving implement is a blade, and wherein the 3D camera is configured to detect a capacity of blade load exceeding the height of the blade based on captured images of the blade within the field of view of the 3D camera.

11. The system of claim 9, wherein the work machine is a track-type work machine including a left track and a right track, and wherein:
the 3D camera is configured to capture images of movements of the left track and the right track, the left track and the right track being within the field of view of the 3D camera;
the computing system is configured to calculate track speed as a function of measured speed of the left track and measured speed of the right based on the captured images;
the global positioning system is configured to calculate work machine speed; and
the computing system is configured to calculate a slippage ratio based on a comparison of the calculated track speed and the calculated work machine speed.

12. A method for determining a position and orientation of an implement on a vehicle, comprising:
determining, with a three-dimensional (3D) camera, a local three-dimensional position in a local coordinate system of each of a plurality of components of the implement in a field of view of the 3D camera;
determining, with a global positioning system and an inertial measurement unit, a global three-dimensional position and orientation of the 3D camera in a global coordinate system;
calculating a global three-dimensional position in the global coordinate system for each of the plurality of components using the local three-dimensional position of each of the plurality of components, the global three-dimensional position of the 3D camera, and the global three-dimensional orientation of the 3D camera; and
calculating a position and orientation of the implement based on the calculated global three-dimensional position of each of the plurality of components.

13. The method of claim 12, wherein the 3D camera is a stereo camera.

14. The method of claim 12, wherein the plurality of components comprise a plurality of markers located on the implement, the plurality of markers including at least one of particular color-based or particular shape-based features.

15. The method of claim 12, wherein the local coordinate system is associated with the 3D camera.

16. The method of claim 12, further comprising:
illuminating the plurality of components with near-infrared radiation to enhance image capture by the 3D camera.

17. The method of claim 12, further comprising:
calculating a height and an inclination of the implement based on the calculated position and orientation of the implement.

18. The method of claim 12, wherein the vehicle is a track-type work machine including a left track and a right track and the implement is an earth-moving implement, the method further comprising:
capturing images of movements of the left track and the right track, the left track and the right track being within the field of view of the 3D camera;
calculating track speed as a function of measured speed of the left track and measured speed of the right track based on the captured images;
calculating vehicle speed using the global positioning system; and
calculating a slippage ratio based on a comparison of the calculated track speed and the calculated vehicle speed.

19. The method of claim 12, wherein the vehicle is an earth-moving work machine and the implement is a blade, the method further comprising:
detecting a capacity of blade load exceeding the height of the blade based on captured images of the blade within a field of view of the 3D camera.

20. A computer program embodied on a non-transitory computer-readable medium, for determining a position and orientation of an implement on a vehicle, the computer program configured to cause at least one processor to perform operations comprising:
determining, with a three-dimensional (3D) camera, a local three-dimensional position in a local coordinate system of each of a plurality of components of the implement in a field of view of the 3D camera;
determining, with a global positioning system and an inertial measurement unit, a global three-dimensional position and orientation in a global coordinate system of the 3D camera;
calculating a global three-dimensional position in the global coordinate system for each of the plurality of components using the local three-dimensional position of each of the plurality of components, the global three-dimensional position of the 3D camera, and the global three-dimensional orientation of the 3D camera; and
calculating a position and orientation of the implement based on the calculated global three-dimensional position of each of the plurality of components.

21. The computer program of claim 20, wherein the vehicle is a track-type work machine including a left track and a right track and the implement is an earth-moving implement, and wherein the operations further comprise:
capturing images of movements of the left track and the right track, the left track and the right track being within the field of view of the 3D camera;
calculating track speed as a function of measured speed of the left track and measured speed of the right track based on the captured images;
calculating vehicle speed using the global positioning system; and
calculating a slippage ratio based on a comparison of the calculated track speed and the calculated vehicle speed.

22. The computer program of claim 20, wherein the vehicle is an earth-moving work machine and the implement is a blade, and wherein the operations further comprise:
detecting a capacity of blade load exceeding the height of the blade based on captured images of the blade within the field of view of the 3D camera.

* * * * *

UNITED STATES PATENT AND TRADEMARK OFFICE
CERTIFICATE OF CORRECTION

| | |
|---|---|
| PATENT NO. | : 11,846,091 B2 |
| APPLICATION NO. | : 16/976480 |
| DATED | : December 19, 2023 |
| INVENTOR(S) | : Vorobiev et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 782 days.

Signed and Sealed this
Eighth Day of July, 2025

Coke Morgan Stewart
*Acting Director of the United States Patent and Trademark Office*